(12) United States Patent
Shao et al.

(10) Patent No.: US 9,484,580 B2
(45) Date of Patent: Nov. 1, 2016

(54) PLATINUM MONOLAYER FOR FUEL CELL

(75) Inventors: Minhua Shao, Manchester, CT (US);
Sathya Motupally, Milford, CT (US);
Belabbes Merzougui, Dhahran (SA);
Lesia V. Protsailo, Bolton, CT (US)

(73) Assignee: Audi AG, Ingolstadt (DE)

( * ) Notice: Subject to any disclaimer, the term of this patent is extended or adjusted under 35 U.S.C. 154(b) by 654 days.

(21) Appl. No.: 13/530,201

(22) Filed: Jun. 22, 2012

(65) Prior Publication Data
US 2013/0340915 A1 Dec. 26, 2013

(51) Int. Cl.
| *H01M 4/04* | (2006.01) |
| *B05C 3/02* | (2006.01) |
| *H01M 4/86* | (2006.01) |
| *H01M 4/88* | (2006.01) |
| *H01M 4/92* | (2006.01) |
| *C23C 18/54* | (2006.01) |
| *H01M 8/10* | (2016.01) |

(52) U.S. Cl.
CPC ............ *H01M 4/8663* (2013.01); *C23C 18/54* (2013.01); *H01M 4/8814* (2013.01); *H01M 4/8842* (2013.01); *H01M 4/92* (2013.01); *H01M 2008/1095* (2013.01); *Y02E 60/50* (2013.01); *Y02E 60/521* (2013.01); *Y10T 156/10* (2015.01)

(58) Field of Classification Search
CPC ........... H01M 8/1018; H01M 4/8663; H01M 4/8814; H01M 4/92; H01M 4/925; H01M 4/8825; H01M 2008/1095; H01M 4/8842; C25D 17/00; C25D 17/06; C23C 18/54

USPC ............................. 156/60; 427/115; 118/429
See application file for complete search history.

(56) References Cited

U.S. PATENT DOCUMENTS

| 4,039,398 A * | 8/1977 | Furuya ..................... C25D 5/02 204/206 |
| 7,964,506 B1 * | 6/2011 | Ponnuswamy et al. ...... 438/687 |
| 2006/0135359 A1 | 6/2006 | Radoslav et al. |
| 2007/0026292 A1 | 2/2007 | Radoslav et al. |
| 2010/0177462 A1 | 7/2010 | Radoslav et al. |
| 2011/0229734 A1 | 9/2011 | Cheung et al. |

FOREIGN PATENT DOCUMENTS

| KR | 1020040104837 A | 12/2004 |
| WO | 2011099956 | 8/2011 |
| WO | 2011099957 | 8/2011 |

OTHER PUBLICATIONS

"Catalyst electrode preparation for PEM fuel cells by electrodeposition." J Appl Electrochem (2010) 40:90-910 by Sajeng et al., published Jul. 2009.*

"Platinum monolayer electrocatalysts for O2 reduction: Pt monolayer on Pd(111) and on carbon-supported Pd nanoparticles." J. Phys. Chem. B 2004 108 1 0955-10964 by Zhang et al., published Apr. 2004.*

(Continued)

*Primary Examiner* — Milton I Cano
*Assistant Examiner* — Michael Dignan
(74) *Attorney, Agent, or Firm* — Seed IP Law Group LLP

(57) ABSTRACT

An example fuel cell electrode forming method includes covering at least a portion of a copper monolayer with a liquid platinum and replacing the copper monolayer to form a platinum monolayer from the liquid platinum.

14 Claims, 2 Drawing Sheets

(56) References Cited

OTHER PUBLICATIONS

"Designer platinum nanoparticles: control of shape, composition in alloy, nanostructure and electrocatalytic property." Nano Today (2009) 4, 143-164 by Yang et al., available Nov. 2008.*

"Platinum monolayer fuel cell electrocatalysts." Top Catal (2007) 46:249-262 by Shao et al., published Nov. 2007.*

"Recent advances in platinum monolayer electrocatalysts for oxygen reduction reaction: scale-up synthesis, structure and activity of Pt shells on Pd cores." Electrochimica Acta 55 (2010) 2645-2652 by Sasaki et al.*

Litster et al. "PEM fuel cell electrodes." Journal of Power Sources (2004) 61-76, available Jan. 2004.*

Popov et al. "Preparation of PEM fuel cell electrodes using pulse electrodeposition." Journal of Power Sources 138 (2004) 14-24, available Aug. 2004.*

International Search Report for International Application No. PCT/US2013/046047 dated Aug. 23, 2013.

Extended European Search Report, dated Feb. 12, 2016, for corresponding European Application No. 13806821.8-1373 / 2865034, 7 pages.

* cited by examiner

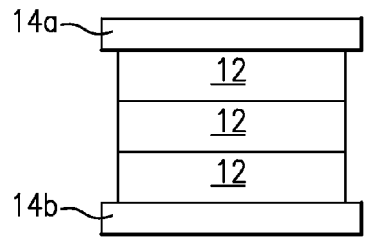
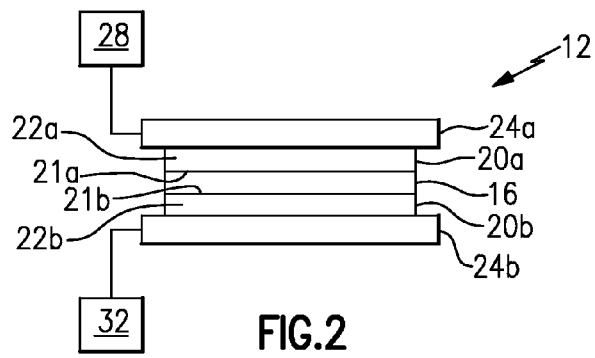
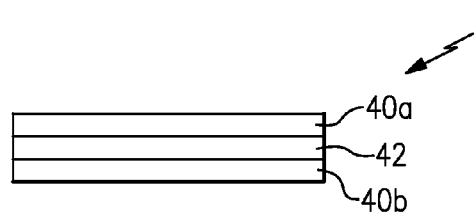
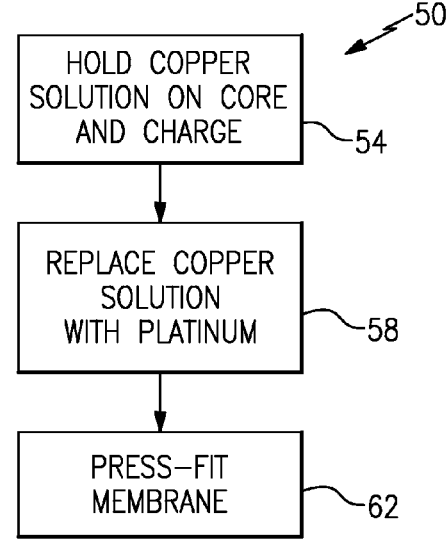

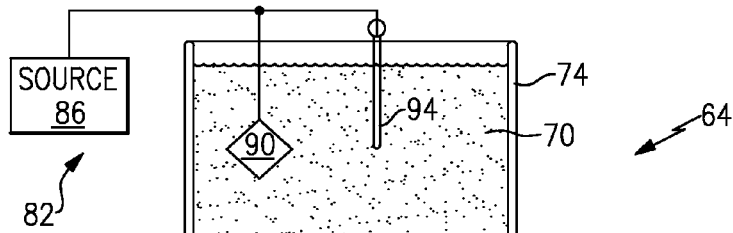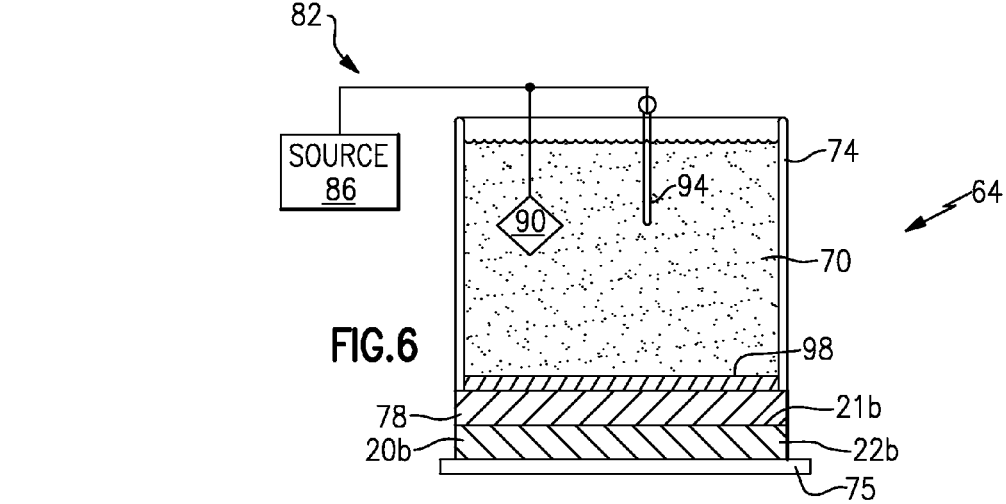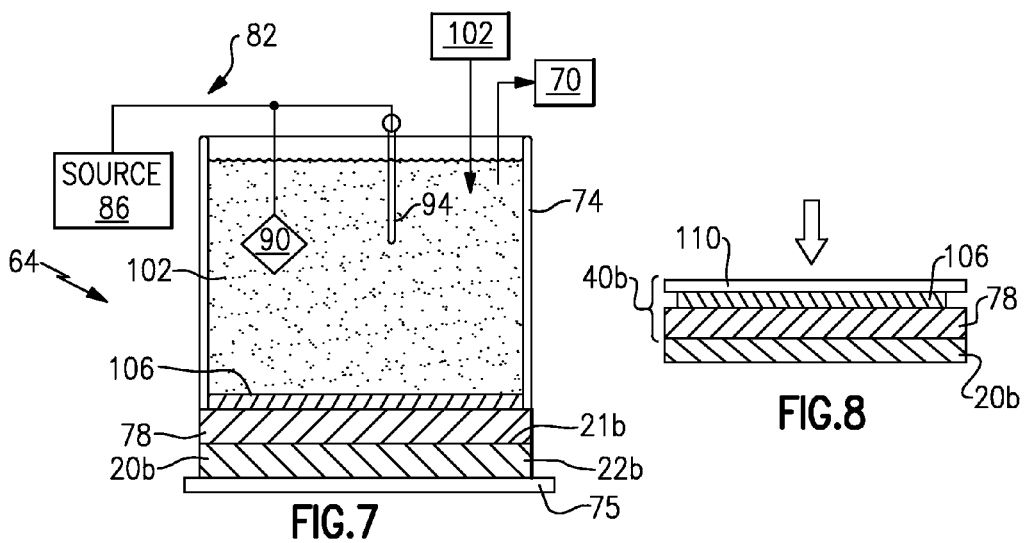

PLATINUM MONOLAYER FOR FUEL CELL

BACKGROUND

This disclosure relates generally to fuel cells and, more particularly, to producing a platinum monolayer catalyst for a fuel cell.

Fuel cell stack assemblies are well known and typically include multiple individual fuel cells. The individual fuel cells may each include a polymer electrolyte membrane (PEM) positioned between two electrodes. The electrodes can be catalyst coated substrates (CCS). The substrates may be gas diffusion layers that include carbon fibers. The substrates distribute fuel cell fluids, such as hydrogen and air. One of the CCS operates as an anode, and the other CCS operates as a cathode. The PEM and the electrodes together establish a membrane electrode assembly (MEA).

The CCS may include a platinum monolayer deposited on a core. Monolayers are one atom thick and the utilization of platinum is much higher than commercial platinum nano-catalysts. The mass production of platinum monolayers is difficult.

SUMMARY

An example fuel cell electrode forming method includes covering at least a portion of a copper monolayer with a platinum solution and replacing the copper monolayer to form a platinum monolayer.

An example electrode forming assembly includes a cell to hold a platinum solution against a copper monolayer when replacing the copper monolayer.

DESCRIPTION OF THE FIGURES

The various features and advantages of the disclosed examples will become apparent to those skilled in the art from the detailed description. The figures that accompany the detailed description can be briefly described as follows:

FIG. 1 shows a schematic view of an example fuel cell stack assembly.

FIG. 2 shows a schematic view of a fuel cell from the fuel cell stack assembly of FIG. 1.

FIG. 3 shows a membrane electrode assembly from the fuel cell of FIG. 2.

FIG. 4 shows the flow of an example method for producing an electrode of the membrane electrode assembly of FIG. 3.

FIG. 5 shows an example monolayer forming assembly with copper solution.

FIG. 6 shows the monolayer forming assembly of FIG. 5 after some of the copper cations have been reduced into a metallic copper monolayer.

FIG. 7 shows the monolayer forming assembly of FIG. 6 after the copper monolayer has been replaced with a platinum monolayer.

FIG. 8 shows a step of sealing the platinum monolayer of FIG. 7.

DETAILED DESCRIPTION

Referring to FIGS. 1 to 3, an example fuel cell stack assembly 10 includes multiple fuel cells 12 arranged in a stack. Pressure plates 14a and 14b clamp the fuel cells 12 of the fuel cell stack assembly 10. Each of the fuel cells 12 includes a membrane 16 positioned between a first catalyst coated substrate (CCS) 20a and a second CCS 20b. The CCS 20a consists of a catalyst layer 21a and a gas diffusion layer 22a. The CCS 20b consists of a catalyst layer 21b and a gas diffusion layer 22b.

A plate 24a abuts the first gas diffusion layer 22a. The plate 24a includes channels (not shown) that deliver a fuel, such as hydrogen, from a fuel supply 28 to the first gas diffusion layer 22a. The fuel moves through the first gas diffusion layer 22a to the catalyst layer 21a. Another plate 24b abuts the second gas diffusion layer 22b. The plate 24b includes channels (not shown) that deliver an oxidant, such as oxygen, from an oxidant supply 32 to the second gas diffusion layer 22b. The oxidant moves through the second gas diffusion layer 22b to the catalyst layer 21b.

The plate 24a may include additional channels that deliver oxidant to a gas diffusion layer of another fuel cell 12 within the fuel cell stack assembly 10. Similarly, the plate 24b may include additional channels that deliver a fuel to a gas diffusion layer of another fuel cell 12 within the fuel cell stack assembly 10.

In this example, the catalyst layer 21b includes a platinum monolayer catalyst, which is supported on other metals such as palladium, gold, or alloys thereof. The anode catalyst layer 21a may include a platinum catalyst, platinum monolayer catalyst, platinum ruthenium alloy catalyst, or some other types of catalyst layer.

Referring now to FIG. 4 with continuing reference to FIGS. 2 and 3, an example method 50 of manufacturing the cathode CCS 20b is shown. If the anode CCS 20a includes a platinum monolayer, the method 50, could also be used to form the anode CCS 20a.

The method 50 includes the step 54 of forming a copper monolayer in a liquid copper solution on a core material coated on the substrate by underpotential deposition (UPD) of copper.

In one example, the core comprises palladium particles supported on carbon black and the copper solution is 0.2 M copper sulfite plus 0.05 M sulfuric acid. The potential is kept at 0.36 V for 1 hour for copper deposition. The method 50 then replaces copper monolayer with platinum by adding platinum solution in the copper solution at a step 58 under open circuit potential. The displacement occurs via the reaction: $Cu+Pt^{2+} \rightarrow Pt+Cu^{2+}$. In one example, the platinum solution contains 1 mM $K_2PtCl_4$, 0.05 M sulfuric acid and 0.2 M citric acid. After the step 58, a platinum monolayer remains on the core. At a step 62, the method 50 press-fits a membrane 16 over the platinum monolayer catalyst layer to form the catalyst membrane assembly. The platinum monolayer catalyst powder may also be collected from the substrate. The core may be supported by a gas diffusion layer, such as the gas diffusion layer 22a during the method 50.

An example of selected portions of the step 54 in the method 50 is shown with reference to an electrode forming assembly 64 of FIGS. 5 and 6. In this example, copper solution 70 is held within an electrochemical cell 74. The cell 74 is made of glass, polytetrafluroethylene (e.g., TEFLON®), plastic or any other materials stable under the conditions of method 50. The method 50 may include a pump 82 to force the platinum solution circuit through the body of the cell 74, catalyst layer 21b and gas diffusion layer 22b to avoid an un-uniform coating of platinum monolayer. The CCS 20b is sandwiched between the cell 74 and a plate 75. The plate 75 may include some channels for circuiting platinum solution. In an example, the plate 75 is made of polytetrafluroethylene (e.g., TEFLON®).

The core 78 is coated on the gas diffusion layer 22b using a known coating or spraying method to form a catalyst layer 21b. The core 78 is made from a palladium, platinum, gold, palladium alloy, platinum alloy, gold alloy, or some combination of these. The catalyst layer 21b also may include ionomer in addition to any of the above materials or any other material. In one example, the ionomer is Nafion.

The gas diffusion layer 21b supports the core 78. The gas diffusion layer 21b is a carbon fiber paper, which, in one example, is sprayed with materials that form the core 78.

The gas diffusion layer 21b is treated with polytetrafluoroethylene (e.g., Teflon®) in some examples. In other examples, the gas diffusion layer 21b is not treated. A bi-layer, such as a carbon black having a binder, may be disposed between the gas diffusion layer 21b and the core 78 to improve the management of water and reactants.

In this example, an electrochemical cell assembly 82 is used to deposit a copper monolayer and platinum monolayer. The electrochemical cell assembly 82 includes a potentiostat 86, a counter electrode 90, and a reference electrode 94. At least the contact electrode 90 and the reference electrode 94 include portions within the copper solution 70.

Applying a potential on the core 78 in the copper solution 70 within the cell 74 forms a metallic copper monolayer 98 on the core 78. The copper monolayer 98 is formed from the reduction of some of the copper cations in copper solution 70. In this example, the gas diffusion layer 20b and the core 78 are pressed against the copper solution 70 and the cell 74 as the copper monolayer 98 is deposited on the core 78. One example includes using an under-potential-deposition process to deposit the copper monolayer 98 on the core 78.

The CCS acts as a working electrode of the electrochemical cell assembly 82 during the deposition. A person having skill in this art and the benefit of this disclosure would understand how to deposit copper with the electrochemical cell assembly 82 to form the copper monolayer 98.

An example of selected portions of step 58 of the method 50 is shown in FIG. 7. In this example, the copper solution 70 has been removed from the cell 74 or mixed with a platinum solution 102. The copper monolayer 98, which is metallic copper, remains on the catalyst layer 21b and is covered by the platinum solution 102. During oxidation of the copper monolayer 98, the atoms of the copper monolayer 90 are replaced with platinum atoms to form a metallic platinum monolayer 106 that is one atom thick. The reaction is illustrated here: $Cu+Pt^{2+} \rightarrow Pt+Cu^{2+}$.

An example of selected portions of the step 62 of the method 50 is shown in FIG. 8. In this example, a membrane 110, such as a polymer electrolyte membrane, is press fit on the platinum monolayer 106 to complete the CCS 20b. The step 62 is a hot press in some examples.

Features of the disclosed example include a method that produces a relatively uniform platinum monolayer, which provides a catalyst having a relatively high activity and durability due to uniform platinum deposition. Direct platinum deposition would not result in a monolayer, but would instead produce platinum particles and thick platinum film. Also, this method avoids the ink mixing process of the platinum monolayer catalyst when making the membrane electrode assembly.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A fuel cell electrode forming method, comprising:
   providing a gas diffusion layer;
   providing a catalyst core layer, the catalyst core layer supported by the gas diffusion layer;
   supporting the gas diffusion layer between an electrochemical cell and a plate, the plate having channels for circulating a platinum solution;
   depositing a copper monolayer on the catalyst core layer;
   covering at least a portion of the copper monolayer supported by the gas diffusion layer of the fuel cell electrode with the platinum solution; and
   replacing the copper monolayer to form a platinum monolayer from the platinum solution by exposing the copper monolayer to the platinum solution while forcing the platinum solution through the gas diffusion layer with a pump.

2. The fuel cell electrode forming method of claim 1, including press fitting a membrane to the platinum monolayer.

3. The fuel cell electrode forming method of claim 2, wherein the membrane comprises a polymer electrolyte membrane.

4. The fuel cell electrode forming method of claim 1, wherein the platinum monolayer is at least one atom thick.

5. The fuel cell electrode forming method of claim 1, wherein the copper monolayer is one atom thick.

6. The fuel cell electrode forming method of claim 1, including coating the gas diffusion layer with a core material to form the catalyst core layer.

7. The fuel cell electrode forming method of claim 1, wherein the gas diffusion layer is a carbon paper.

8. The fuel cell electrode forming method of claim 7, wherein the carbon paper is hydrophilicity or hydrophobilicity treated.

9. The fuel cell electrode forming method of claim 1, wherein the gas diffusion layer has a bilayer.

10. The fuel cell electrode forming method of claim 1, wherein the catalyst core layer comprises at least one of palladium, platinum, gold, ruthenium, rhodium, iridium, osmium, rhenium, silver, and their alloys.

11. The fuel cell electrode forming method of claim 6, wherein the core material is mixed with a proton conductive ionomer.

12. A method for forming a fuel cell electrode in an electrochemical cell, the method comprising:
    providing a gas diffusion layer;
    providing a catalyst core layer, the catalyst core layer supported by the gas diffusion layer;
    positioning the gas diffusion layer between the electrochemical cell and a plate, the plate having channels for circulating a platinum solution;
    depositing a copper monolayer on the catalyst core layer;
    covering at least a portion of the copper monolayer supported by the gas diffusion layer of the fuel cell electrode with the platinum solution, the electrochemical cell containing the platinum solution; and
    replacing the copper monolayer to form a platinum monolayer from the platinum solution, the replacing including exposing the copper monolayer to the platinum solution while forcing the platinum solution through the gas diffusion layer.

13. The method of claim 12, further comprising pressing the copper monolayer and the catalyst core layer against a copper solution.

14. The method of claim 12, wherein forcing the platinum solution through the gas diffusion layer includes forcing the platinum solution through the gas diffusion layer with the assistance of channels provided in the plate supporting the gas diffusion layer.

\* \* \* \* \*